Aug. 30, 1949.                    W. F. WESTENDORP                    2,480,169
                              APPARATUS FOR IMPARTING HIGH
Filed Oct. 26, 1946            ENERGY TO CHARGED PARTICLES            3 Sheets-Sheet 1

Inventor:
Willem F. Westendorp,
by Harry E. Dunham
His Attorney.

Inventor:
Willem F. Westendorp,
by Harry C. Dunham
His Attorney.

Aug. 30, 1949.                    W. F. WESTENDORP                    2,480,169
                            APPARATUS FOR IMPARTING HIGH
Filed Oct. 26, 1946         ENERGY TO CHARGED PARTICLES                3 Sheets-Sheet 3

Inventor:
Willem F. Westendorp,
by Harry E. Dunham
His Attorney.

Patented Aug. 30, 1949

2,480,169

UNITED STATES PATENT OFFICE 2,480,169

APPARATUS FOR IMPARTING HIGH ENERGY TO CHARGED PARTICLES

Willem F. Westendorp, Schenectady, N. Y., assignor to General Electric Company, a corporation of New York Application October 26, 1946, Serial No. 705,923

13 Claims. (Cl. 250—27)

The present invention relates to apparatus for imparting high energy to charged particles by repeated acceleration of such particles.

The invention is applicable in connection with apparatus of the type disclosed in United States Patent application Serial No. 639,462, filed January 5, 1946 in the names of Herbert C. Pollock and Willem F. Westendorp and assigned to the General Electric Company, a corporation of New York. Such apparatus comprises means for initially accelerating charged particles by the action of a field produced by a time varying magnetic flux and for thereafter producing continued acceleration of such particles by a localized electric field of cyclically varying character. My present invention is primarily concerned with the provision of improved apparatus of this character.

One object of the invention is the provision of a structually compact equipment in which the mass of the magnetic system is appreciably reduced over designs previously available.

A further object of the invention is to provide a construction which permits ready access to the discharge vessel within which charged particles are caused to be accelerated and which will lend itself readily to bringing out a stream of accelerated particles or a stream of radiations produced by such particles.

Viewed generally, these objects, together with certain others to be specified in the following, are realized by the use of a simplified magnetic structure in combination with novel means for energizing the same.

The features of the invention desired to be protected herein are pointed out in the appended claims. The invention itself, together with further objects and advantages thereof, may best be understood by reference to the following description taken in connection with the accompanying drawings in which

Figure 1:
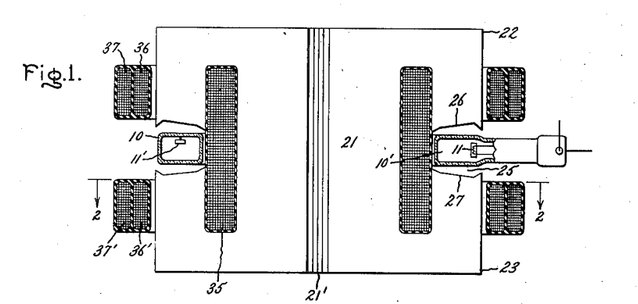
Fig. 1 is a partially sectionalized view of an accelerator suitably embodying the invention.
Figures 2, 3:
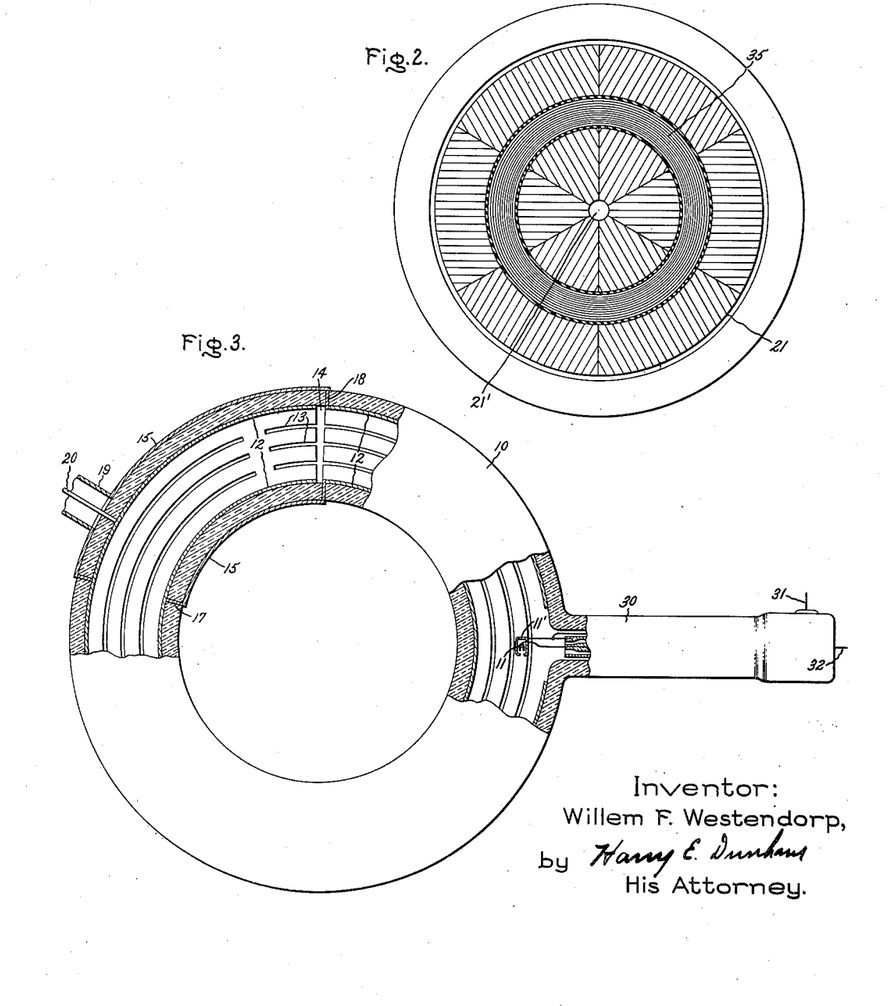
Fig. 2 is a section on line 2—2 of Fig. 1.
Fig. 3 is an enlarged view of the discharge vessel of Fig. 1, shown partly broken away.

Referring particularly to Fig. 1, there is shown in section a closed doughnut-shaped glass vessel 10 which defines within its interior an annular chamber 10'. The vessel provides a circular orbit in which charged particles (e. g., electrons) derived from a source indicated generally at 11 may be accelerated to a high energy level. After acceleration, the electrons are to be intercepted by a target 11' which is offset from the accelerating orbit. For the purpose of accelerating the electrons, the vessel is provided internally with means for producing a localized electric field alternating at high frequency and thus adapted to act repeatedly on electrons gyrating within the vessel. The high frequency electrode system may comprise one of the constructions described in application Serial No. 691,293 of Anatole M. Gurewitsch, filed August 17, 1946 and assigned to the General Electric Company. An exemplary construction is illustrated in Fig. 3, which may be regarded as an enlarged partially sectionalized view of the vessel 10 of Fig. 1. The construction illustrated provides on the interior of the vessel 10, which is preferably of glass or other suitable dielectric material, highly evacuated, a conductive metal coating 12 consisting, for example, of silver. This coating is longitudinally subdivided by the provision of uncoated strips 13 which have the function of minimizing circulating currents induced in the tube by the changing magnetic field to which the tube is to be subjected as hereinafter described. A gap 14 formed between longitudinally spaced portions of the coating provides a region across which a high frequency electric field may be established. On the outside of the discharge vessel 10 there is provided a second conductive metal coating 15 which extends over only a portion of the vessel. Coating 15 is electrically connected to the inner coating 12 by two metal rings 17 and 18 sealed into the wall of the discharge vessel. It is to be noted that the ring 18 connects directly with the portion of the coating 12 which forms the right-hand boundary of the gap 14, while the ring 17 is connected to the coating 12 at a point which is to the left of the gap 14 and appreciably spaced from it. Actually, the spacing of the ring 17 with reference to the gap 14 is chosen to represent electrically a quarter wave length at the desired frequency of the field to be established across the gap 14. With the correct selection of longitudinal dimensions, the space between the conductors 12 and 15 constitutes in effect a space resonant system comprising a quarter wave concentric transmission line section. Accordingly, if the structure thus provided is excited at the proper frequency, a cyclically reversible electric field of high intensity may be made to appear across the gap 14. By choosing the frequency of reversal of this field to correspond to the frequency of rotation of electrons maintained in a circular orbit of rotation within the vessel 10, an increase in the energy level of such electrons may be effected at each traversal of the gap. The frequency of this field may be determined as described in a copending application, Serial No. 639,462 by Herbert C. Pollock and W. F. Westendorp, filed January 5, 1946 and assigned to the same assignee as the instant application, and may be approximately 57 megacycles for an orbit diameter of 66 inches. A field of the desired frequency may be supplied to the quarter wave resonator by means of concentric conductors 19 and 20 connected as indicated. The source of high frequency power is not shown but may comprise, for example, an electronic oscillator of known type.

The means employed for maintaining in a circular orbit electrons acted upon by the electric field just referred to comprises a magnetic (e. g., laminated iron) structure represented in Figs. 1 and 2 as including a cylindrical core 21 passing through the vessel 10 and consequently linking the proposed orbital path of the electron. A duct 21' is provided through the core for cooling purposes. The core has at its extremities magnetic members 22 and 23, respectively, which extend radially out and then converge parallel to the core 21 to provide a gap 25 formed between opposed pole pieces 26 and 27. This gap contains the tube 10 and hence the locus of the desired orbital path of the electrons to be accelerated. Means shortly to be described are provided for producing across this gap a magnetic guide field which increases in a manner related to the rate of increase in energy of electrons accelerated within the vessel 10. Under proper conditions to be hereinafter specified, this permits the electric field generated within the vessel across the gap 14 to bring the electrons to very high energy levels while the electrons are magnetically retained in a stable orbit.

This method of imparting high energy to electrons by the application of combined electric and magnetic fields, referred to as the "synchrotron" process, depends among other things upon providing electrons at or near the ultimate orbit of gyration at a velocity sufficiently close to that of light so that they can thereafter be considered to travel at constant speed, subsequent increments of energy appearing as an increase in mass. Only under these conditions can their traversal of the gap 14 be synchronized with the cyclical reversals of the constant frequency electric field applied to the gap for accelerating purposes.

In the construction of Fig. 3 electrons are provided in the evacuated space within the discharge vessel 10 by means of an electron gun comprising a cathode assembly 11 and an accelerating and directing electrode 11'. These are supplied with potential and, in the case of the cathode, with heating current by means of conductors extending out-through a stem 30 and connecting with external conductors sealed through the wall of the stem. Only the accelerating electrode conductor 31 and one of the cathode conductors 32 appear in the drawing. However, electrons so provided are necessarily introduced at relatively low velocity, their energy not exceeding one hundred thousand electron volts, and additional means must be provided for bringing them to a much higher velocity before they can be satisfactorily maintained in a relatively fixed orbit by the synchrotron principle. As is explained in the aforementioned Pollock and Westendorp application Serial No. 639,462, this may be done in one way by the use of an initial period of magnetic induction acceleration. My present invention is primarily concerned with the application of this type of initial acceleration in connection with a simple, compact and lightweight apparatus.

The magnetic structure of the apparatus of Fig. 1 has already been described as comprising the core 21 and the mutually opposed pole pieces 26 and 27. It is particularly to be noted that this structure lacks an external yoke or other low reluctance means providing a return path for magnetic flux tending to leave the upper and lateral surfaces of the parts shown, so that the return of any such flux is necessarily by an air path, inherently of relatively high reluctance. The significance of this from an operational standpoint will be indicated later. From a structural standpoint, it presents the advantage of minimizing the weight of the magnetic system and also of increasing the accessibility of the tube 10 both from the standpoint of manipulating the tube and from the standpoint of utilizing high velocity electrons or other high energy radiations eventually produced by the tube.

For the purpose of energizing the magnetic structure, there are provided several sets of coils. One of these, a first magnetizing means, is designated as 35 and is arranged so as to embrace only the core 21. A second coil, shown as being divided into two sections 36 and 36', assumed to be connected in series, embraces the complete magnetic structure, including both the pole pieces 26 and 27 and the core 21. A third coil having series connected parts 37 and 37' also embraces the complete magnetic structure and is adapted when energized to supplement the effect of the coils 36, 36'. Since these second and third coils both embrace the complete magnetic structure and therefore produce fluxes which have similar effects upon the magnetic circuit, they may be conjointly termed a second magnetizing means. It is proposed in the following to indicate how the various coils just referred to may be energized in such fashion as initially to permit acceleration by magnetic induction of electrons introduced within the vessel 10 and thereafter to facilitate the continued acceleration of such electrons by the synchrotron principle, this result being accomplished by a favorable reorientation of the magnetic flux traversing the magnetic structure.

The first phase of operation, that is, the period of magnetic or betatron acceleration, may best be explained by reference to Fig. 4 which shows diagrammatically the energizing circuits used in connection with the various coils of the magnetic system above referred to. In this figure the portion of the circuit which is active during the period of magnetic acceleration has been emphasized by the use of heavy lines in the circuit diagram. The various magnetizing coils are indicated by the numbers which identify them in Fig. 1.

Figure 4:
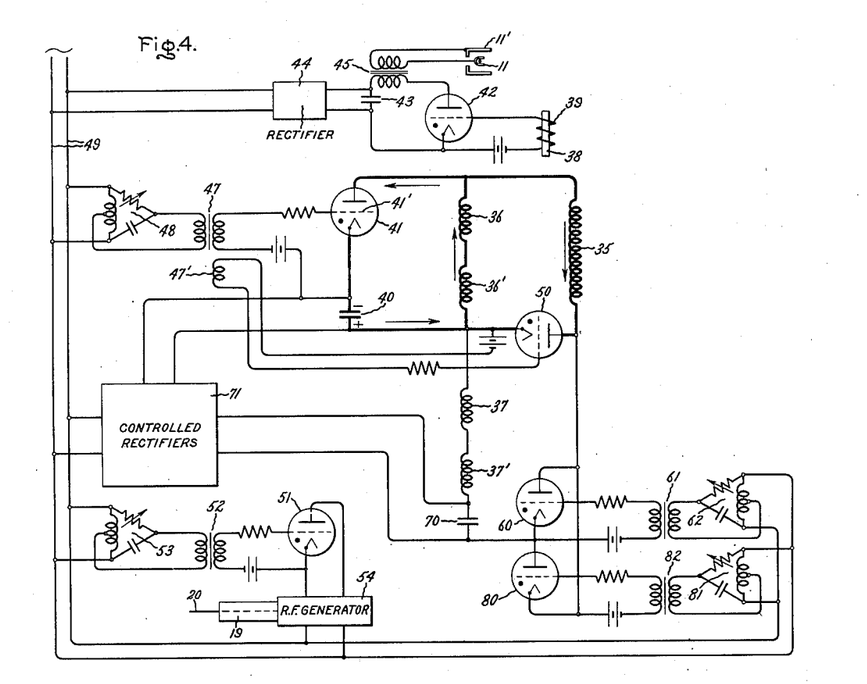
Fig. 4 is a schematic representation of an excitation circuit for the device of Fig. 1 with certain aspects emphasized by the use of heavy lines.

The operating cycle may be considered to start approximately at the time at which electrons are introduced into the discharge vessel 10 (Fig. 3) by application of a pulse of favorable potential to the electrodes 11 and 11' (shown schematically at the upper right of Fig. 4). The means by which this is accomplished are indicated in Fig. 4 as comprising a strip 38 of high magnetic permeability material assumed to be so placed as to extend between pole pieces 26 and 27 (Fig. 1) and provided with a winding 39 in which is generated a pulse of voltage as described in U. S. Patent 2,394,071, a vapor discharge valve 42 which is triggered by this voltage pulse, a capacitor 43 charged from a suitable source of rectified potential 44 and a pulse step-up transformer 45. The terminals of the pulse transformer 45 feed the power pulse generated by the discharge of the capacitor 43 to the electrodes 11 and 11' of the electron gun. As described in the aforesaid U. S. Patent 2,394,071 the triggering action provided by the winding 39 around strip 38 takes place near the time in the cycle at which the magnetic field goes through zero and can be accurately adjusted in time by a direct current bias (not shown) applied to the winding. It is assumed that prior to the time of electron injection condenser 40 has been charged from a controlled rectifier source 71 in the direction indicated by the polarity signs shown in Fig. 4. At or slightly before the instant of electron injection a controlled gaseous rectifier 41 in series with the condenser 40 is triggered by application of a favorable potential to its grid 41'. The circuit by which such triggering is accomplished in proper correlation to the injection of electrons comprises a peak voltage generating transformer 47 energized by a phase-shifting network 48 which receives its power from a source 49 of alternating voltage of the same frequency as the repetition rate at which the accelerating apparatus is to repeat its cycle of operation.

The firing of the tube 41 places the potential of the condenser 40 across the coils 36, 36'. Moreover, by concurrent triggering by means of a third winding 47' on peaking transformer 47 of a second controlled gaseous rectifier 50 connected in circuit between the coils 36, 36' and the coil 35, the latter coil is placed directly in parallel with the former. Under these circumstances, the coil pair 36, 36' and the coil 35 will enclose fluxes inversely proportional to their turn ratio. By proper selection of this ratio, therefore, the flux traversing the central core 21 (Fig. 1) may be maintained in such relation to the field existing between the pole pieces 26 and 27 as to cause electrons within the discharge vessel 10 to be inductively accelerated while being maintained in fixed orbit in accordance with the so-called betatron principle. A detailed discussion of the field relationships required in this connection is given in D. W. Kerst United States Patent No. 2,297,305 granted September 29, 1942 and assigned to the General Electric Company. In general, it is required that the following relationship be maintained.

$$\Delta\phi = 2\pi r^2 B$$

Where $\Delta\phi$ is the total change in flux through the electron orbit, $r$ is the radius of the orbit and $B$ is the flux density of the guide field at the orbit.

In the present connection, fulfillment of this relationship requires the aggregate number of turns in coils 36 and 36' to be appreciably less than the turns in coil 35. Because of the parallel connection and inductive coupling of the coils 36, 36' with coil 35, the latter coil will automatically assumes a current flow opposite to that in the former coils so that the flux traversing the core 21 may be assumed to be due to the difference of these currents. This current relationship is schematically indicated by arrows associated with the various coils in Fig. 4.

Figure 5:
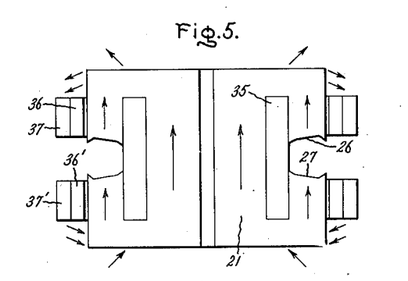
Fig. 5 is a diagrammatic illustration of the magnetic circuit of Fig. 1 in the condition prevailing during excitation of the heavy line circuit of Fig. 4.

The flux distribution in the magnetic structure during the period now under consideration is illustrated in Fig. 5 by the arrows shown applied to the structure. It will be noted that the flux through the core 21 and that through the pole pieces 26 and 27 is all in the upward direction which implies that its return must be by means of the high reluctance air path outside the magnetic structure. This is indicated by arrows in proximity to the various surfaces of the magnetic structure. It should be noted, however, that during the period of initial acceleration, the magnetic fluxes involved are relatively weak so that in spite of the inclusion of an air path in the magnetic circuit, they can be obtained without application of excessive power to the energizing circuits.

After the electrons have been brought by magnetic induction to an energy level corresponding to several (i. e., 2 to 5) million electron volts, their velocity will be within a few percent of the velocity of light and may thereafter be considered as constant. It is, therefore, possible after attainment of such velocity to switch over to the synchrotron type of operation and thus to carry the electrons to much higher energy levels than would be possible by magnetic means alone.

This means in the first instance that the electrode system provided within the vessel 10 (Fig. 3) for producing localized electric fields (i. e., across the gap 14) must be energized by the application of a high frequency potential through conductors 19 and 20. This may be done by the action of a timing circuit including an electronic switching valve 51 of the vapor type, and a triggering circuit consisting of a peaked voltage transformer 52 and a phase shifting network 53 connected to the same source of power 49 as used in conjunction with the firing circuit of tube 41. The electronic switching valve initiates energization of a high frequency power source 54 which furnishes the high frequency potential through conductors 19 and 20 to the electrode system associated with gap 14 (see Fig. 3).

Figure 6:
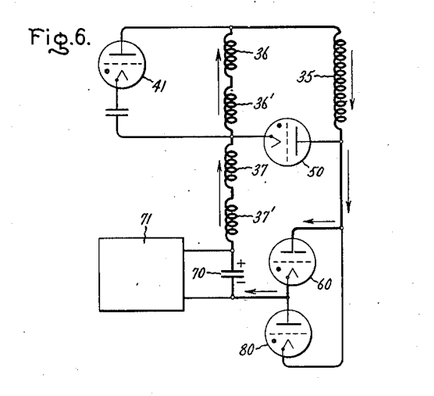
Fig. 6 is a repetition of a portion of the circuit of Fig. 4 with certain additional aspects of the circuit being emphasized by heavy lines.

In accordance with my invention, shortly after the high frequency electrode system is brought into play switching of the magnetizing circuit is accomplished to create the closed circuit indicated by the heavy line portion of Fig. 6 in which current is caused to flow serially through coils 37, 37'; 36, 36' and 35. This is done by firing tube 60 which may be a controlled gaseous rectifier of the type illustrated or, alternatively, a controlled mercury pool tube. The triggering of this tube is controlled by a timing circuit shown in Fig. 4 which comprises a peaked voltage producing transformer 61 connected to a phase shifting network 62 which is energized by the power source 49.

When the tube 60 is fired, this initiates discharge of a condenser 70 which has been preliminarily charged by a circuit including an appropriately timed controlled source of D.-C. potential. Such circuit is assumed to be included in apparatus within the block outline 11, and may comprise a rectifier in which by means of grid controlled gaseous discharge tubes current flow is permitted only during that part of the cycle of operation during which no current flows in coils 37 and 37'.

Flow of current from the condenser 40 reverses the direction of the potential applied to the tube 50 and thus renders that tube non-conductive. Conduction of the tube 41 may be assumed also to cease, first because firing of tube 60 is timed to occur at a point when the condenser 40 is essentially discharged, and secondly, because the application of the potential of the condenser 70 through discharge tube 60 renders the common terminal of coils 36 and 35 negative.

Figure 7:
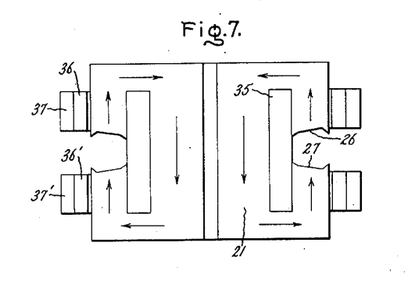
Fig. 7 represents a condition of the magnetic circuit corresponding to the excitation of the heavy line circuit of Fig. 6.

The effect of the various coils 35, 36 and 37 under the conditions indicated in Fig. 6 is such as considerably to increase the magnetic field in the space between the pole pieces 26 and 27 (i. e., at the electron orbit). It is to be noted, moreover, that since the coils 36, 36' are no longer connected in parallel with the coil 35, a reversal of flux through the latter coil may and, in fact, does occur. With this reversal, the core 21 now serves as a low reluctance return path for flux passing between the pole pieces 26 and 27 so that the need for such flux to return by the high reluctance air path external to the magnetic structure no longer exists. This condition is illustrated in Fig. 7 by the arrows associated with the magnetic structure illustrated in that figure. As a matter of fact, by choosing the number of turns in coils 37, 37' so that the total turns provided by coils 36 and 36' plus 37 and 37' is equal to the number of turns in coil 35, the tendency of flux to leave the top or lateral surfaces of the magnetic structure can be essentially suppressed. Accordingly, by continuing concurrently to increase the energization of the various coils (i.e., by supplying them in series as indicated in Fig. 6) the flux traversing the magnetic structure can be increased to a relatively high level without excessive application of magnetizing power because of the fact that substantially all the flux is confined to a low reluctance path. Accordingly, a field can be maintained in the gap between the pole pieces 26 and 27 sufficient to hold electrons in the desired orbit even though such electrons are brought to very high energy levels by the continued action of the localized electric field impressed across the gap 14 in the high frequency electrode system (Fig. 3).

It will be noted, of course, that the effects just described are realized by reversal of the flux passing through the core 21 with a consequent reversal of the forces applied inductively by such field to the electrons within the discharge vessel. However, such reversed forces are relatively inconsequential in comparison with the opposite and much greater accelerating effect of the localized electric fields produced by the high frequency electrode system. Consequently, this "negative betatron action" can readily be tolerated for the sake of the improved distribution of the magnetic flux to which it is attributable. The net effect of the arrangement described is to provide an apparatus in which a relatively light and compact magnetic structure is enabled to perform the functions essential both to an initial period of betatron operation and ensuing period of synchrotron operation.

Figure 8:
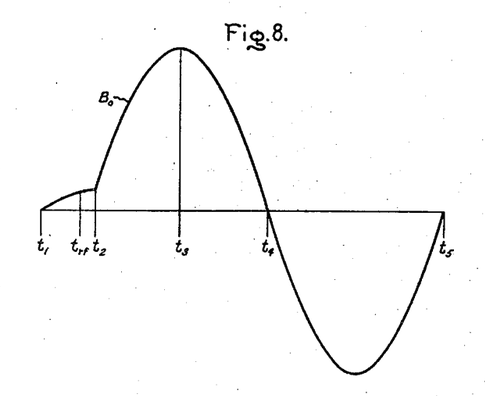
Figs. 8 and 9 are graphical illustrations useful in explaining the invention.
Figure 9:
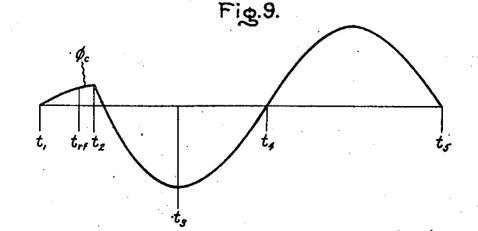

The complete cycle of operation of the apparatus may be aptly summarized by reference to the graphical representations of Figs. 8 and 9. The curve $B_0$ of Fig. 8 represents the magnetic field strength at the electron orbit whereas the curve $\phi_c$ of Fig. 9 represents the variations in flux through the magnetic core 21 (Fig. 1). The coils 36, 36' and the coil 35 are energized at the time $t_1$ (i. e., by switching of the tubes 41 and 50, Fig. 4) with resultant discharge of the condenser 40. At this time or shortly thereafter electrons are injected into the discharge vessel. The field $B_0$ and the flux $\phi_c$ continue to build up along a smooth curve as indicated until a time $t_2$ at which time the tube 60 (Fig. 6) fires. Application of potential to the high frequency electrodes contained within the vessel 10 may be initiated at a time $t_{2'}$ which somewhat precedes the time $t_2$ so that a slight overlap of the periods of betatron and synchrotron operation is realized.

At the time $t_2$ discharge of current from the condenser 70 (Fig. 6), which should be charged to a potential materially above the maximum potential of the condenser 40, produces an abrupt acceleration of the rate of growth of the field $B_0$ with an attendant reduction and eventual reversal of the flux $\phi_c$ as previously explained. This growth of the guide field continues until a time $t_3$ at which the condenser 70 is wholly discharged. The time $t_3$ corresponds to the attainment of maximum energy of the accelerated electrons. Accordingly, means must be provided for shifting the orbit of the accelerated electrons to cause them to be intercepted by the target 11' (Fig. 1) which, as previously explained, is somewhat offset from the accelerating orbit. The orbit shifting means form no part of my present invention and are, therefore, not particularly described herein. They may, however, be of the character specified in my prior Patent No. 2,394,072, granted February 5, 1946 and assigned to the General Electric Company, which describes means for displacing the electron orbit axially of the discharge vessel to cause it to be intercepted at the end of the accelerating cycle.

By the time point $t_3$ is reached, the energy originally stored in the condenser 70 is effectively transferred to the magnetic field linking the coils 35 to 37, inclusive. In accordance with known principles of oscillating circuits, this energy will tend to return to capacitive storage by progressive diminution and eventual reversal of current flow in the circuit containing the condenser and the coils. Accordingly, the field $B_0$ and the flux $\phi_c$ will return to zero value at a time $t_4$. At this time tube 80 is made conductive in place of the tube 60 (which concurrently becomes non-conductive because of the reversal of the potential applied to it) thus permitting a reversal of the current flow through the coils 35 to 37 and completion of the oscillatory cycle. Conductivity of tube 80 is controlled by a timing circuit including a phase shifting network 81 and a peaked voltage generating transformer 82. At the time indicated at $t_5$, the field $B_0$ and the flux $\phi_c$ will have again returned to zero level and with the tubes 41, 50 and 60 biased to cutoff the operating cycle will terminate. After the complete full wave oscillation has taken place, capacitor 70 is restored to its original polarity if not quite to its original voltage.

The duration of a given cycle of operation may be from several thousandths of a second to about a sixtieth of a second and the cycle may be repeated at from one to sixty times per second. The cycle length is determined mainly by the circuit constants, while the repetition rate may be controlled by the choice of appropriate means for timing the triggering of the tubes 41 and 50.

Figure 10:
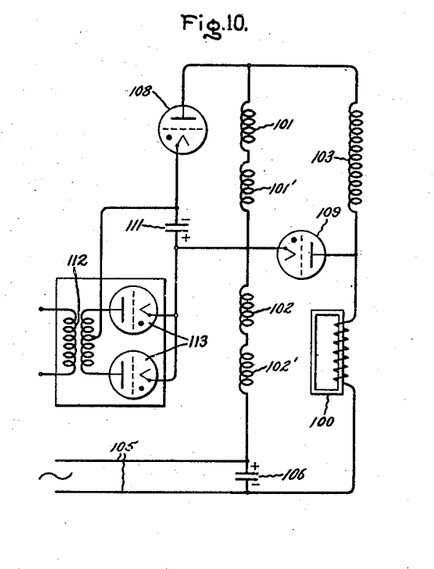
Fig. 10 represents a modification of the invention.

In a modification of the invention, continuous operation may be obtained by means of the circuit of Fig. 10 which uses a saturating reactor 100 in place of the tubes 60 and 80 of Fig. 6. This has distinct advantages where it is convenient to use an operating frequency of sixty cycles per second and the power can be obtained directly from a supply line. This modification is illustrated in Figs. 10 to 12 in which Fig. 10 shows schematically a circuit embodying it, curves V and I of Fig. 11 represent voltage and current conditions which might obtain in an imagined (but not actually realized) condition of operation of the circuit, and curves $V_a$ and $B_0$ of Fig. 12 represent, respectively, the voltage appearing across the coil 103 of Fig. 10 and the field strength developed at the electron orbit by the actual operation of the circuit.

In Fig. 10 coils 101, 101', 102, 102' and 103 are assumed to correspond to the similarly disposed coils of Figs. 4 and 6, and are to be considered as being associated with a magnetic structure and discharge vessel in the manner illustrated in Fig. 1. The portion of the energizing circuit described in Fig. 4 as controlling the synchrotron portion of the operating cycle includes the saturating reactor 100 which comprises, for example, a winding with a closed high permeability laminated core. It has a relatively high inductance when the current drops below 1% or 2% of the anticipated crest value but has negligible inductance when saturated by higher current values. The power input for the synchrotron portion of the illustrated circuit comprises a high voltage supply line 105 which may be a 60 cycle sine wave source. This is connected across a condenser 106 and, ignoring certain other considerations shortly to be specified, tends to produce a current which is nearly sinusoidal as shown by the curve I of Fig. 11. However, such a current, if produced, would have flattened regions as indicated at $x$ near its zero values because of the high inductance which the reactor 100 attains at these points. The voltage across coil 103 corresponding to current curve I would take the form indicated by the curve V.

Figure 11:
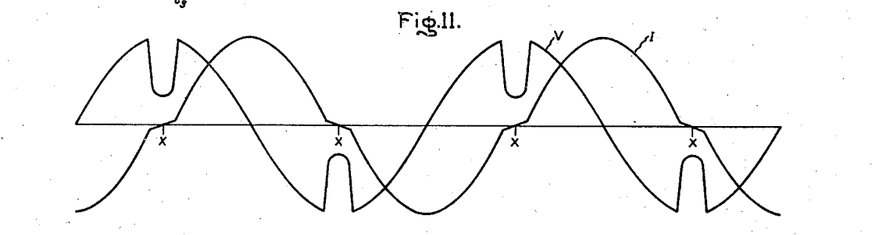
Figs. 11 and 12 are graphical representations explaining the operation of Fig. 10.
Figure 12:
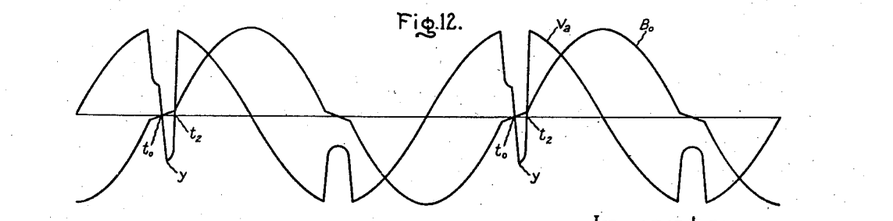

At periods when the reactor 100 is saturated, most of the voltage impressed across the condenser 106 appears across the coils 101 to 103 and serves to produce series current flow through these coils of a form consistent with the curve I of Fig. 11. This portion of the cycle is, therefore, favorable to synchrotron acceleration of electrons within the discharge vessel assumed to be associated with the coils.

However, prior to attainment of such synchrotron operation and when the current is approaching zero value as at $x$ in Fig. 11, the reactor 100 takes a large share of voltage because of its relatively increased inductance. The interposition of this high inductance may be said to "isolate" coil 103 from condenser 106 during the low current intervals. This circumstance makes it possible to cause betatron action to occur during these intervals.

This is accomplished by triggering the tubes 108 and 109 at a time $t_0$ (Fig. 12) which corresponds to the attainment of zero value of the current through the coils and also to the time of injection of electrons into the accelerating chamber. This may be done by timing circuits which are not shown in Fig. 10 but which may be assumed to be of the character of those illustrated in Fig. 4. Triggering these tubes applies the voltage of a condenser 111, charged from a properly controlled D.-C. source, including transformer 112 and rectifiers 113, to the polarity indicated in Fig. 10 to the coils 101, 101' and 103 in parallel, thus causing a reversed or negative voltage suddenly to appear across these coils as indicated at $y$, Fig. 12. This voltage immediately starts to "decay" in the positive direction as condenser 111 discharges. The voltages across 101, 101' and 103 being now identical as a result of their parallel connection, the relationship of the gap field and the core flux may be fixed in accordance with the inverse ratio of their turns as previously described, and by proper choice of the turn ratio betatron action may be obtained. The voltage of capacitor 111 does not appear directly through tube 109 across the coils 102, 102' because of the isolating effect of the reactor 100 which thus prevents an exchange of energy between capacitors 106 and 111 through transformer action of the closely coupled windings 101 and 102. During this part of the operating cycle the flux through the core of the magnetic structure and the guide field within the gap are codirectional and a certain proportion of the magnetic flux is forced to return by an air path exactly as indicated in Fig. 5.

During the betatron part of the cycle, the parallel connection of coils 101, 101' and 103 through tube 109 offers a low inductance circuit and a fast discharge takes place through tube 108, leaving condenser 111 without charge. When condenser 111 is discharged, coils 101, 101' and 103 lose their applied voltage from this source and tube 109 stops conducting. By virtue of saturation of reactor 100 which acts as a switch in this connection, flow of series current through coils 101 to 103 from voltage source 105 and condenser 106 is resumed, and the circuit reverts to the synchrotron cycle at or soon after time $t_2$. The high frequency electric field is applied at or just before $t_2$, and at or shortly after $t_2$ the flux in the magnetic core reverses with respect to the guide field as explained in connection with Fig. 7. Thus electrons brought to an energy level of several million electron volts by the initial period of betatron action are subsequently carried to much higher levels by synchrotron action.

In all other respects (i. e., with reference to disturbance of the orbit of the accelerated electrons and their useful employment) the operation of the circuit of Fig. 10 is the same as that of the arrangement of Fig. 1.

What I claim as new and desire to secure by Letters Patent of the United States is:

1. Apparatus for accelerating charged particles in a circular orbit comprising electrically energized means inductively coupled with said orbit for producing a time-varying magnetic flux linking the said orbit and a codirectional time-varying magnetic guide field coextensive with said orbit, the path of said flux including a low reluctance portion and a high reluctance portion, further electrically energized means coupled with said orbit and operative after initial acceleration of said particles by the action of said flux to additionally accelerate them by another mechanism, and energy-directing means operative concurrently with said last-named means to increase said guide field by reorienting said flux to confine it to the low reluctance portion of said path.

2. Apparatus for accelerating charged particles along an orbital path, including magnetic means inductively coupled with said path for producing an increasing magnetic flux linking said path to effect initial inductive acceleration of said particles and for further producing an increasing magnetic guide field codirectional with said flux and extending throughout the locus of said path, whereby the accelerated particles are maintained in said path, secondary accelerating means electrostatically coupled with said path and acting on said particles after said initial inductive acceleration thereof, and energy-directing means operative during the action of said secondary accelerating means to increase the magnetic guide field by relatively decreasing and eventually reversing said flux whereby the accelerated particles are continuously maintained in said path with minimum magnetic energization of said apparatus.

3. Apparatus for accelerating charged particles along an orbital path, including a magnetic structure having a core linking said path and a gap containing the locus of said path, coil means magnetically coupled with said structure for energizing said structure to produce an increasing magnetic flux through said core to effect initial inductive acceleration of said particles and further to produce an increasing magnetic field in said gap codirectional with said flux whereby the accelerated particles are maintained in said path, secondary accelerating means coupled with said path and acting on said particles after said initial inductive acceleration thereof, and energy-directing means operative during the action of said secondary accelerating means to increase the magnetic field in said gap by relatively decreasing and eventually reversing the flux through said core whereby the accelerated particles are continuously maintained in said path with minimum energization of the magnetic structure.

4. Apparatus for accelerating charged particles along an orbital path, including a magnetic structure having a core linking said path and a gap containing the locus of said path, coil means magnetically coupled with said structure for energizing said structure to produce an increasing magnetic flux through said core to effect initial inductive acceleration of said particles and further to produce an increasing magnetic field in said gap codirectional with said flux, whereby the accelerated particles are maintained in said path, electrode means electrostatically coupled with said path for producing a localized electric field acting on said particles to further accelerate them after their initial inductive acceleration, and energy-directing means operative during the action of said electric field to increase the magnetic field in said gap by relatively decreasing and eventually reversing the flux through said core, whereby the accelerated particles are continuously maintained in said path with minimum energization of the magnetic structure.

5. Apparatus for accelerating charged particles along an orbital path comprising a magnetic core linking said path, magnetic members extending radially out from the extremities of said core and then converging parallel to said core to provide between them an annular gap containing the locus of said path, first magnetizing means embracing only said core, second magnetizing means embracing both the core and said outlying members, means for initially energizing both said magnetizing means to produce an increasing magnetic flux through said core and a codirectional increasing magnetic guide field in said gap, thereby inductively accelerating said particles, secondary accelerating means electrostatically coupled with said path and acting on said particles after initial inductive acceleration thereof, and means operative during the action of said secondary means to modify the energization of said first and second magnetizing means so that said guide field is increased by decreasing and eventually reversing said flux whereby the accelerated particles are continuously maintained in said path with minimum magnetization of said apparatus.

6. Apparatus for accelerating charged particles along an orbital path comprising a magnetic core linking said path, magnetic members extending radially out from the extremities of said core to provide between them an annular gap containing the locus of said path, a first coil enclosing only said core, second coils enclosing both the core and said outlying members, means for initially energizing both said coils in parallel to produce an increasing magnetic flux through said core and a codirectional increasing magnetic guide field in said gap, such energization of said coils causing said particles to be maintained in said path by said guide field while being accelerated by said flux, secondary electrically energized accelerating means coupled with said path and acting on said particles after initial inductive acceleration thereof, and energy-directing means operative during the action of said secondary means to modify the energization of said coils by connecting them in series so that said guide field is increased by decreasing and eventually reversing said flux, whereby the accelerated particles are continuously maintained in said path with minimum magnetic energization of said apparatus.

7. Apparatus for accelerating charged particles along an orbital path comprising a magnetic core linking said path, magnetic members extending radially out from the extremities of said core and then converging parallel to the core to provide between them an annular gap containing the locus of said path, a first coil enclosing only said core, second coils enclosing both the core and said outlying members, means for initially energizing both said coils in parallel to produce an increasing magnetic flux through said core and a codirectional increasing magnetic guide field in said gap, such energization of said coils causing said particles to be maintained in said path by said guide field while being accelerated by said flux, secondary accelerating means acting on said particles after initial inductive acceleration thereof, and switching means operative substantially concurrently with the energization of said secondary accelerating means to change the parallel energization of said coils to series energization, whereby said guide field is increased by decreasing and eventually reversing said flux.

8. Apparatus for accelerating charged particles along an orbital path comprising a magnetic core linking said path, magnetic members extending radially from the extremities of said core to provide between them an annular gap containing the locus of said path, a first coil embracing only said core, a second coil embracing both the core and said outlying members, means for initially energizing both said coils in parallel to produce an increasing magnetic flux through said core to accelerate said particles and a codirectional increasing magnetic guide field in said gap to maintain the accelerated particles in said path, the return of flux traversing said core and said members being by an air path outside said members, secondary accelerating means acting on said particles after initial inductive acceleration thereof, and means operative during the action of said secondary means to change the energization of said coils from parallel to series and concurrently to supplement the magnetizing effect of said second coil so as to produce an increase in said guide field by reducing and eventually reversing said flux, whereby the accelerated particles are continuously maintained in said orbital path without any substantial increase in the flux traversing said air path.

9. Apparatus for accelerating charged particles along an orbital path comprising a magnetic core linking said path, magnetic members extending radially out from the extremities of said core and then converging parallel to the core to provide between them an annular gap containing the locus of said path, a first coil enclosing only said core, a second coil enclosing both the core and said outlying members, means for initially energizing both said coils in parallel to produce an increasing magnetic flux through said core and a co-directional magnetic guide field in said gap whereby said particles are concurrently inductively accelerated and maintained in said path, secondary accelerating means acting on said particles after initial inductive acceleration thereof, a third coil enclosing both said core and said outlying members, a voltage source adapted to energize said coils in series, and a switching circuit including a reactor which saturates substantially concurrently with the energization of said secondary accelerating means to connect said coils in series with said voltage source, whereby said guide field is substantially increased by decreasing and eventually reversing said accelerating flux.

10. Apparatus for the acceleration of charged particles along an orbital path comprising: a magnetic core linking said path; magnetic members extending radially outward from the extremities of said core to provide between them an annular gap; an annular evacuated envelope containing the locus of the path within said annular gap; a source of charged particles adjacent the locus of said path within said envelope; an alternating voltage source; an energy supply circuit for controlling the release of charged particles into said path from said particle source in dependence upon the cyclical variations of said voltage source; first coil means enclosing only said core; second coil means enclosing both said core and said outlying members, said first and second coil means being electrically connected in parallel through a first switching device; a second switching device and an electrical energy storage device forming a series circuit which is connected across the parallel circuit comprising said first and second coil means; a triggering circuit controlled by said voltage source and connected to apply a triggering voltage to said first and second switching devices at approximately the time of release of particles into said path so that said energy storage device may discharge through the parallel circuit comprising said first and second coil means, the effect of such parallel excitation of said coil means being to produce fluxes in said central core and said gap which are co-directional whereby said particles are inductively accelerated along said path by said core flux while being maintained in the path by the field corresponding to said gap flux; high frequency electrode means energized in timed relation to the variations of said voltage source and electrostatically coupled to said path by proximity thereto to supply additional energy to said particles after said inductive acceleration thereof; a circuit connected in parallel with said first switching device including the series combination of third coil means embracing both said core and said outlying members, a further energy storage device and a third switching device, said third coil means being connected to induce a magnetic field co-directional with that of said first coil means when energized in series therewith; and triggering means controlled from said voltage source to supply a triggering voltage to said third switching device after initiation of the operation of said high frequency electrode means whereby said further energy storage device may discharge serially through said first, second and third coil means to increase said guide field by intensifying the flux in said gap and consequently reversing the flux in said core so that the particles are continuously maintained in said path in spite of the additional acceleration imparted to them by said high frequency electrode means.

11. Apparatus for the acceleration of charged particles along an orbital path comprising: a magnetic core linking said path; magnetic members extending radially outward from the extremities of said core to provide between them an annular gap; an annular evacuated envelope containing the locus of the path within said annular gap; a source of charged particles adjacent the locus of said path within said envelope; an alternating voltage source; an energy supply circuit for controlling the release of charged particles into said path from said particle source in dependence upon cyclical variations of said voltage source; first coil means enclosing only said core; second coil means embracing both said core and said outlying members, said first and second coil means being electrically connected in parallel through a first controlled rectifier; a second controlled rectifier and a capacitor forming a series circuit which is connected across the parallel circuit comprising said first and second coil means, said capacitor having a charging circuit connected thereto and controlled by said source of alternating voltage whereby said capacitor may be charged to a desired potential in timed relation to the cyclical variations of said voltage source; a triggering circuit controlled by said voltage source and connected to apply a triggering voltage to said first and second controlled rectifiers at approximately the time of release of particles into said path so that said capacitor may discharge through the circuit comprising said first and second coil means, the effect of such parallel excitation of said coil means being to produce fluxes in said central core and said gap which are co-directional whereby said particles are inductively accelerated along said path by said core flux while being maintained in the path by the field corresponding to said gap flux; high frequency electrode means energized in timed relation to the variations of said voltage source and electrostatically coupled to said path by proximity thereto to supply additional energy to said particles after said inductive acceleration thereof; a circuit connected in parallel with said first controlled rectifier including the series combination of third coil means embracing both said core and said outlying members, a further capacitor and a third controlled rectifier, said third coil means being connected to induce a magnetic field co-directional with that of said first coil means when energized in series therewith; and triggering means controlled from said voltage source to supply a triggering voltage to said third controlled rectifier after initiation of the operation of said high frequency electrode means whereby said further capacitor may discharge serially through said first, second and third coil means to increase said guide field by intensifying the flux in said gap and consequently reversing the flux in said core so that the particles are continuously maintained in said path in spite of the additional acceleration imparted to them by said high frequency electrode means.

12. Apparatus for the acceleration of charged particles along an orbital path comprising: a magnetic core linking said path; magnetic members extending radially outward from the extremities of said core to provide between them an annular gap; an annular evacuated envelope containing the locus of the path within said annular gap; a source of charged particles adjacent the locus of said path within said envelope; an alternating voltage source; an energy supply circuit for controlling the release of charged particles into said path from said particle source in dependence upon the cyclical variations of said voltage source; first coil means enclosing only said core; second coil means enclosing both said core and said outlying members, said first and second coil means being electrically connected in parallel through a first switching device; a second switching device and an electrical energy storage device forming a series circuit which is connected across the parallel circuit comprising said first and second coil means; a triggering circuit controlled by said voltage source and connected to apply a triggering voltage to said first and second switching devices at approximately the time of release of particles into said path so that said energy storage device may discharge through the parallel circuit comprising said first and second coil means, the effect of such parallel excitation of said coil means being to produce fluxes in said central core and said gap which are co-directional whereby said particles are inductively accelerated along said path by said core flux while being maintained in the path by the field corresponding to said gap flux; high frequency electrode means energized in timed relation to the variations of said voltage source and electrostatically coupled to said path by proximity thereto to supply additional energy to said particles after said inductive acceleration thereof; third coil means embracing both said core and said outlying members and electrically connected across said first switching device in series with a saturable reactor and a further energy storage device which is alternately charged from said voltage source, said reactor being saturable substantially concurrently with the timed energization of said electrode means to cause said first and second switching devices to be extinguished and said first, second and third coil means to be connected in series circuit whereby said further energy storage device may discharge through said last-named series circuit to increase said guide field by intensifying the flux in said gap and consequently reversing the flux in said core so that the particles are continuously maintained in said path in spite of the additional acceleration imparted to them by said high frequency electrode means.

13. Apparatus for the acceleration of charged particles along an orbital path comprising: a magnetic core linking said path; magnetic members extending radially out from the extremities of said core to provide between them an annular gap; an annular evacuated envelope containing the locus of the path within said annular gap; a source of charged particles adjacent the locus of said path within said envelope; means including an alternating voltage source for controlling the release of charged particles into said path in dependence upon the cyclical variations of said voltage source; first coil means enclosing only said core; second coil means embracing both said core and said outlying members, said first and second coil means being electrically connected in parallel through a first controlled rectifier; a second controlled rectifier and a capacitor forming a series circuit which is connected in parallel with the parallel circuit comprising said first and second coil means; a charging circuit connected between said source of alternating voltage and said capacitor whereby said capacitor may be charged to a desired potential in timed relation to the cyclical variations of said voltage source; a triggering circuit controlled by said voltage source and connected to apply a triggering voltage to said first and second controlled rectifiers at approximately the time of release of said particles into said path whereby said capacitor may discharge through the parallel circuit comprising said first and second coil means to produce an increasing magnetic flux through said core and a co-directional magnetic guide field in said gap, said field and said flux causing said particles to be inductively accelerated along said path; high frequency electrode means energized in timed relation to the variations of said voltage source and electrostatically coupled to said path to supply additional energy to said particles after said inductive acceleration; a circuit connected in parallel with said first controlled rectifier including third coil means embracing both said core and said outlying members, a capacitor connected to be charged in timed relation to the variations of said source and a third controlled rectifier, said third coil means being connected to induce a magnetic field co-directional with that of said first coil means when energized in series therewith; and a triggering circuit energized from said source and connected to supply a triggering voltage to said third rectifier after initation of the operation of said high frequency electrode means whereby said last-named capacitor may discharge serially through said first, second, and third coil means to increase said guide field so that the particles are continuously maintained in said path in spite of the additional acceleration imparted by said high frequency electrode means.

WILLEM F. WESTENDORP.

REFERENCES CITED

The following references are of record in the file of this patent:

UNITED STATES PATENTS

| Number | Name | Date |
|---|---|---|
| 2,103,303 | Steenbeck | Dec. 28, 1937 |
| 2,229,572 | Jonas | Jan. 21, 1941 |